United States Patent Office 3,225,045
Patented Dec. 21, 1965

3,225,045
IMINOMETHYLENEBIS-HETEROCYCLES
Lloyd A. Walker, Akron, Ohio, assignor to Monsanto Company, a corporation of Delaware
No Drawing. Original application Sept. 10, 1963, Ser. No. 307,813. Divided and this application Feb. 12, 1964, Ser. No. 351,268
10 Claims. (Cl. 260—250)

This is a division of application Serial No. 307,813, filed September 10, 1963, which in turn is a continuation-in-part of Serial No. 43,986, filed July 20, 1960, the latter now abandoned.

The present invention relates to a process of improving the properties of rubber compositions and more particularly to improving the properties of rubber mixes containing a relatively high proportion of reinforcing pigments.

The so called "low hysteresis" processing of carbon black-rubber mixes by masticating the mixes at high temperatures for extended periods of time has long been known. Improvements have been made from time to time by discovery of chemical adjuvants which shorten the required mixing times. Heretofore these techniques required special processing at elevated temperatures after which the vulcanizing ingredients were added in the usual manner. Significantly, the need for special processing has been eliminated by the present invention. The action of the adjuvants heretofore used in the low hysteresis processing of carbon black-rubber mixtures has been explained on the basis of promoting the reaction between rubber and carbon black. While the improved adjuvants provided by the present invention are presumed to function by similar mechanisms, this is not really known and the invention is in nowise limited to any theories as to their mode of action.

An object of the invention is to provide an improved process for preparing low hysteresis rubber vulcanizates. A particular object is to provide promoting agents effective at low temperatures. A general object of the invention is to improve the properties of natural and synthetic rubbers by means of special treating agents. Another object is to provide agents which increase the modulus, lower the torsional hysteresis and decrease the internal friction of rubber vulcanizates. A specific object is to promote the reaction between rubber and carbon black or other reinforcing pigment by organic chemical catalysts. A further specific object is to improve dispersion of carbon black.

Improved vulcanizates are obtained according to the present invention by incorporating into the rubber a small amount of an arylenebismethylimide as hereinafter disclosed in detail and heating. Amounts of 0.1–5% of the rubber hydrocarbon comprise the practical useful range under most conditions. These are not the absolute limits and measurable effects are obtained with even smaller amounts. Similarly, larger amounts can be used but usually without advantage. The preferred range is 0.25–1.0%. Vulcanizing and other ingredients as desired are added after mixing and heating rubber, reinforcing pigment and promoter. Addition of the new adjuvants increases modulus of the vulcanizates. At the same time, such vulcanizates retain reasonable elongation.

Any of the rubber reinforcing pigments may be used in the practice of the present invention, as for example, reinforcing silica but preferably carbon black, as for example reinforcing furnace blacks and channel blacks. The amount of black is desirably at least 25 parts by weight per 100 parts by weight of rubber and usually 40–50 parts by weight in the case of tread stocks. Carbon black is normally added first in the mixing cycle and in the usual practice of the invention the promoter is added concomitantly with it. On the other hand, the promoter may be premixed with the carbon black and the mixture added to rubber. Alternatively, rubber and promoter are admixed followed by the carbon black and other ingredients as desired. Banbury mixing is advantageous because it exerts severe masticating action and achieves uniform dispersion of the ingredients within short mixing times. The chemical adjuvants exert pronounced pigment dispersing effect.

The adjuvants used in the practice of the invention may be represented by the general formula

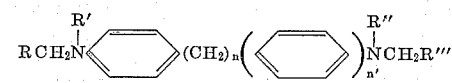

where $n$ and $n'$ are zero or one with the proviso that when $n'$ is zero $n$ is also zero, $R'$ and $R''$ are hydrogen, nitroso or low alkyl groups and $R$ and $R'''$ are imino radicals and preferably imido radicals. Examples of $R$ and $R'''$ include,

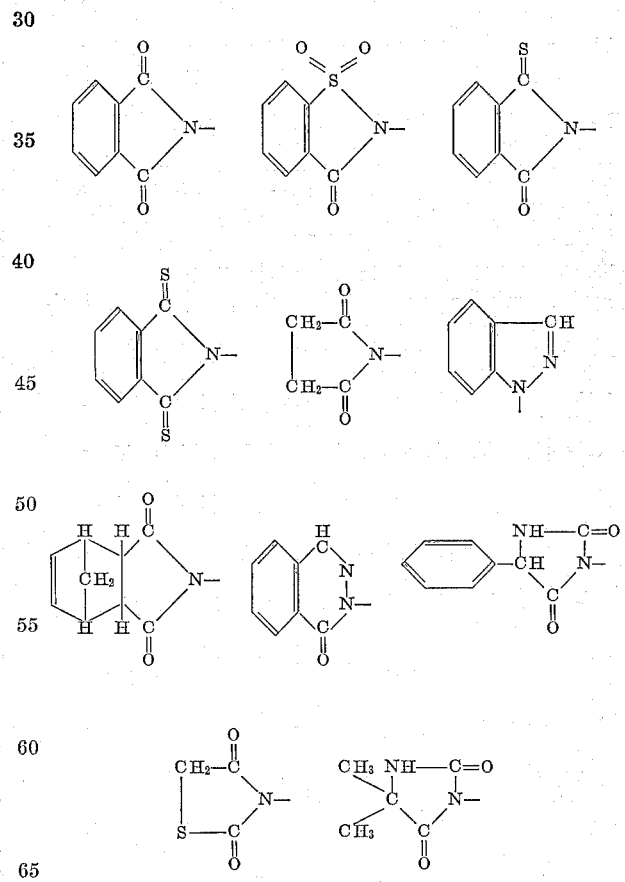

While the imino radical can be varied quite widely the presence of unsaturation except aromatic unsaturation is undesirable although it can be tolerated in some instances as illustrated. The groups R and R''' are preferably hydantoinyl or orthophenyleneimido radicals. The orthophenylene radicals may be variously substituted by one of more chlorine, bromine, fluorine or iodine atoms, lower alkyl, lower alkoxy or nitro substituents. The hydantoin ring may be unsubstituted or substituted by phenyl or lower alkyl. The same applies to the 2,4-thiazolidine dione ring. Some of the compounds are known and others are readily available by similar methods from the imine, aromatic diamine or dialkyl aromatic diamine and formaldehyde or paraformaldehyde. One or two nitroso groups may then be introduced subsequently if desired. The imine-aldehyde amine reaction may be effected in the rubber matrix, although less efficiently, by adding the reaction components to the rubber.

Examples of compounds suitable in practice of the invention are

N,N'-p-phenylenebis(iminomethylene)bis(4-nitrophthalimide) also named N,N'-bis(4-nitrophthalimidomethyl)-p-phenylenediamine, N,N'-p-phenylenebis(iminomethylene)bis(4-chlorophthalimide) also named N,N'-bis(4-chlorophthalimidomethyl)-p-phenylenediamine, N,N'-p-phenylenebis(iminomethylene)bis(1,2-benzisothiazolin-3-one-1,1-dioxide), N,N'-p-phenylenbis(iminomethylene)di(thiophthalimide) also named N,N'-bis(thiopthalimidomethyl)-p-phenylenediamine, N,N'-p-phenylenebis(iminomethylene)di(dithiophthalimide) also named N,N'-bis(dithiophthalimidomethyl)-p-phenylenediamine, N,N'-p-phenylenebis(iminomethylene)di(2,4-thiazolidinedione), N,N'-p-phenylenebis(iminomethylene)dipthalimide also named N,N'-bis(phthalimidomethyl)-p-phenylenediamine, N,N'-p-phenylenebis(iminomethylene)disuccinimide, also named N,N'-bis(succinimidomethyl)-p-phenylenediamine, N-nitroso-N,N'-p-phenylenebis(iminomethylene)diphthalimide, N,N'-[4,4-biphenylenebis(iminomethylene)]dipthalimide also named N,N'-bis(phthalimidomethyl)benzidine, N,N'-bis(phthalimidomethyl)-p,p'-diaminodiphenylmethane, N,N'-p-phenylenebis(iminomethylene)ditetrahydrophthalimide, also named N,N'-bis(tetrahydrophthalimidomethyl)-p-phenylenediamine, N,N'-p-phenylenebis(iminomethylene)bis(bicyclo[2.2.1]hept-5-ene-2,3-dicarboximide)

1,1'-p-phenylenebis(iminomethylene)bis(4-methoxy-7-nitroindazole 1,1'-p-phenylenebis(methiminomethylene)bis(4-chloroindazole)

1,1'-p-phenylenebis(iminomethylene)bis(5-nitroindazole)

1,1'-p-phenylenebis(iminomethylene)bis(5-methylindazole)

1,1'-p-phenylenebis(iminomethylene)bis(5-ethoxyindazole)

1,1'-p-phenylenebis(iminomethylene)diindazole 1,1'-p-phenylenebis(iminomethylene)bis(4-fluoroindazole)

N-nitroso-1,1'-p-phenylenebis(imionmethylene) diindazole 3,3'-p-phenylenebis(iminomethylene)bis (5-phenylhydantoin)

3,3'-p-phenylenebis(iminomethylene)bis(5,5-dimethylhydantoin)

3,3'-p-phenylenebis(iminomethylene)bis(5-methylhydantoin)

3,3''-p-phenylenebis(iminomethylene)bis(5-ethylhydantoin)

3,3'-p-phenylenebis(iminomethylene)dihydantoin 2,2'-p-phenylenebis(iminomethylene)di(1-phthalazinone)

N-phthalimidomethyl-N'-tetrahydrophthalimidomethyl-p-phenylenediamine

N,N'-p-phenylenebis(iminomethylene)bis(3-chlorophthalimide)

N,N'-p-phenylenebis(iminomethylene)bis(4,5-dichlorophthalimide)

N,N'-p-phenylenebis(iminomethylene)bis (3,4-dischlorophthalimide)

N,N'-p-phenylenebis(iminomethylene)bis(3,6-dichlorophthalimide)

N,N'-p-phenylenebis(iminomethylene)bis(3,5-dichlorophthalimide)

N,N'-p-phenylenebis(iminomethylene)bis(3,4,6-trichlorophthalimide)

N,N'-p-phenylenebis(iminomethylene)bis(4,5-dibromophthalimide)

N,N'-p-phenylenebis(iminomethylene)bis(4-iodophthalimide)

N,N'-p-phenylenebis (iminomethylene)bis(3,4-dimethoxyphthalimide)

N,N'-bis(phthalimidomethyl)-N,N'-dimethyl-p-phenylenediamine

N,N'-bis(phthalimidomethyl)-N,N'-diethyl-p-phenylenediamine 3,3'-[4,4'-biphenylenebis(iminomethylene)]bis(5,5-dimethylhydantoin)

3,3'-[4,4'-methylenebis(phenyleneiminomethylene)]bis(5,5-dimethylhydantoin)

3,3'-p-phenylenebis(methyliminomethylene)bis(5,5-dimethylhydantoin)

N-(5,5-dimethyl-3-hydantoinylmethyl)-N'-phthalimidomethyl-p-phenylenediamine

N-(5,5-dimethyl-3-hydantoinylmethyl)-N'-succinimidomethyl-p-phenylenediamine

N-nitroso-N,N'-bis(5,5-dimethyl-3-hydantoinylmethyl)-p-phenylenediamine

N,N'-p-phenylenebis(methiminomethylene)di(2,4-thiazolidinedione)

N,N'-p-phenylenebis(iminomethylene)bis(5,5-dimethyl-2,4-thiazolidinedione)

As illustrative of the desirable properties imparted to rubber compositions by the arylenebismethylimides, examples thereof are added along with carbon black to styrene-butadiene copolymer rubber in a Banbury mixer. SBR-1502 rubber, 1400 parts by weight, is charged to the Banbury mixer and mixed for 3 minutes at 25° C. The test material is then added to a portion, 400 parts by weight, of the rubber from the Banbury mixer. The addition is made on the differential rolls of a rubber mill at 50° C. The stock is milled for about 5 minutes and cut several times from side to side to obtain adequate dispersion. The milled portion containing the test material is then added to the remainder of the stock in the Banbury mixer together with carbon black. The mixer is heated to 100° C. before making these additions. Banbury mixing is continued for a total of 6 minutes at 100° C. and the stocks then dumped and passed six times through a rubber mill at 50° C. Vulcanizable stocks are compounded on the mill at 50° C. by adding stearic acid, zinc oxide, saturated hydrocarbon softener, sulfur and N-cyclohexyl-2-benzothiazolesulfenamide. These are then compared to a similarly prepared stock without the chemical additive. The completed formulations are as follows:

|  | Stock, Parts by Weight | |
|---|---|---|
|  | A | B |
| SBR-1502 | 100 | 100 |
| Chemical additive | | 0.5 |
| Carbon black (high abrasion furnace) | 50 | 50 |
| Zinc oxide | 4 | 4 |
| Stearic acid | 2 | 2 |
| Saturated hydrocarbon softener | 10 | 10 |
| N-cyclohexyl-2-benzothiazolesulfenamide | 1.2 | 1.2 |
| Sulfur | 1.75 | 1.75 |

The stocks are cured in the usual manner by heating in a press at 144° C. The modulus of elasticity at 300% elongation at the optimum cures is determined in the usual manner. Torsional hysteresis is determined at room temperature with an apparatus which embodies a torsional pendulum. In this apparatus the sample of rubber tested supplies the force to restore the pendulum when it is deflected. The logarithmic decrement of the observed amplitude is recorded. Heat rise after flexing in a Goodrich flexometer at 100° C. is also determined. Typical results are recorded below.

| Chemical Additive | Cure Time in Mins. | 300% Modulus | Torsional Hysteresis | Heat Rise, °C. |
|---|---|---|---|---|
| None | 45 | 1,930 | 0.218 | 39 |
| N,N'-bis(phthalimidomethyl)-p-phenylene diamine | 45 | 2,320 | 0.205 | 28 |
| None | 60 | 2,320 | 0.209 | 31 |
| N,N'-bis(4-nitrophthalimidomethyl)-p-phenylenediamine | 60 | 2,510 | 0.191 | 25 |
| N,N'-bis(phthalimidomethyl)benzidine | 45 | 2,500 | 0.179 | |
| N,N'-bis(phthalimidomethyl)-N,N'-dimethyl-p-phenylenediamine | 45 | 2,130 | 0.192 | 23 |

It will be noted that incorporating the chemical additives results in increased modulus, lower torsional hysteresis and lower heat rise. The promoters are devoid of accelerating action and while it is preferred to use sulfenamide accelerators as the accelerating component, other vulcanizing systems may be employed. Other accelerators suitable for preparation of vulcanized compositions are mercaptobenzothiazole, dithiobis(benzothiazole), diphenylguanidine, tetramethylthiuram disulfide and tetramethylthiuram monosulfide.

As further examples of the invention, similar tests are carried out by the above-described procedure and the changes from the untreated or control stock A calculated. In the results recorded below + indicates percent increase as compared to the control and − indicates percent decrease. In case of the heat rise data the figures recorded are changed in ° C. from the control instead of percent.

| Chemical additive | 300% Modulus, Percent Change | Elongation, Percent Change | Torsional Hysteresis, Percent Change | Heat Rise, ° C., Change from Control |
|---|---|---|---|---|
| N,N'-bis(succinimidomethyl)-p-phenylenediamine | +5.6 | −12 | −8 | −5 |
| N,N'-bis(bicyclo-[2.2.1]hept-5-ene-2,3-dicarboximidomethyl)-p-phenylenediamine | +3.5 | 0 | −5 | −2 |
| 1,1'-p-phenylenebis-(iminomethylene)-bis(5-nitroindazole) | +10.6 | −9 | −12 | −4 |
| 3,3'-p-phenylenebis-(iminomethylene)-bis(5-phenylhydantoin) | +12.4 | −2 | −10 | 0 |
| 2,2'-p-phenylenebis-(iminomethylene)-di(1-phthalazinone) | +12.2 | −8 | −10 | −6 |
| N-nitroso-N,N'-bis-(phthalimidomethyl)-p-phenylenediamine | +13.1 | −17 | −7 | 0 |

As illustrative of use in natural rubber, 1400 parts by weight of smoked sheet rubber are added to a Banbury mixer and mixed for 5 minutes at 25° C. The chemical to be tested is added to a 400 parts by weight portion of the rubber from the first step on a rubber mill at 70° C. The mixture is milled for 5 minutes, cutting several times from each side to obtain adequate dispersion. Carbon black and the rubber containing the test ingredient are then added to the remainder of the stock in the Banbury mixer after preheating the mixer to 100° C. Mixing is continued for 6 minutes and the stock dumped and passed six times through a rubber mill at 70° C. The remaining ingredients are added on the mill at 70° C. Final compositions are as follows:

|  | Stock, Parts by Weight | |
|---|---|---|
|  | C | D |
| Smoked sheet rubber | 100 | 100 |
| Chemical additive | | 0.5 |
| Carbon black (high abrasion furnace) | 50 | 50 |
| Zinc oxide | 5 | 5 |
| Stearic acid | 3 | 3 |
| Saturated hydrocarbon softener | 3 | 3 |
| N-cyclohexyl-2-benzothiazolesulfenamide | 0.5 | 0.5 |
| Sulfur | 2.5 | 2.5 |

The stocks are cured by heating in a press for 60 minutes at 144° C. and properties compared as hereinabove described.

| Chemical additive | 300% Modulus, Percent Change | Elongation, Percent Change | Torsional Hysteresis, Percent Change | Heat Rise, ° C., Change from Control |
|---|---|---|---|---|
| N,N'-bis(phthalimidomethyl)-p-phenylenediamine | +1.9 | −2.7 | −10.7 | −6 |

Further demonstrations are carried out by mixing the chemical with natural rubber at 100° C. before carbon black is added. The procedure is the same as described above for natural rubber through addition of chemical to the hot Banbury but no carbon black is added at this point. Banbury mixing at 100° C. is continued 3¼ minutes, then one-half the carbon black is added along with the softener and mixed for 1 minute. The remainder of the carbon black is then added and mixing continued for 3 minutes. The stocks are then dumped, milled at 50° C. and other ingredients added all as described previously.

| Chemical Additive | 300% Modulus | Torsional Hysteresis | Heat Rise, °C. |
|---|---|---|---|
| None | 2,940 | 0.180 | 15 |
| N,N'-bis(phthalimidomethyl)-p-phenylenediamine | 3,230 | 0.163 | 15 |
| N,N'-bis(4-nitrophthalimidomethyl)-p-phenylenediamine | 3,260 | 0.156 | 14 |

The new adjuvants are especially useful for compounding blends of natural rubber and SBR copolymer rubber. Due to the poorer hysteresis properties of the synthetic as compared to the natural product, it is not feasible to make thick articles subject to severe stress, as for example large truck tires, from synthetic rubber. Excessive heat accumulates during use causing early failure. However, for reasons of economy it is common to admix natural rubber with the synthetic product but the amount of synthetic which can be used depends upon the hysteresis properties of the mixture. The practice of the present invention permits the use of higher amounts of synthetic than would otherwise be feasible. As illustrative of the advantages obtained from blends of rubbers, a mixture of 70 parts natural rubber and 30 parts styrene-butadiene copolymer rubber is employed in compounding stocks with the chemical adjuvants of this invention. The mixing procedure is the same as that described for natural rubber when the carbon black and promoter were added together. The composition of the vulcanizable stocks finally prepared is as follows:

| | Stock, Parts by Weight | |
|---|---|---|
| | E | F |
| Natural rubber/SBR (70/30) | 100 | 100 |
| Chemical additive | | 0.5 |
| Carbon black (high abrasion furnace) | 50 | 50 |
| Zinc oxide | 4.7 | 4.7 |
| Stearic acid | 2.7 | 2.7 |
| Saturated hydrocarbon softener | 5.0 | 5.0 |
| N-cyclohexyl-2-benzothiazolesulfenamide | 0.71 | 0.71 |
| Sulfur | 2.18 | 2.18 |

Stocks are cured by heating in a press at 144° C. and properties evaluated as hereinabove described.

100–200° C. and is preferably accompanied by mastication. Mastication reduces the time of heating to a normal mixing cycle. Heating time will ordinarily be within the range of 1 minute to 16 hours, depending upon the temperature and whether or not the mix is masticated. It will be apreciated that any vulcanizing ingredients if present must be present in amounts insufficient to cause vulcanization. The heating is advantageously at temperatures equal or above vulcanization temperature.

Arylenebisiminomethylenedihydantoins are new compounds which are especially valuable promoters. Their superior properties are demonstrated in natural rubber as described below. Smoked sheet rubber, 1400 parts by weight, is added to a Banbury mixer and mixed for 6 minutes at 150° C. Zinc oxide, stearic acid and a 400 parts by weight portion of the pre-masticated natural rubber is added to an Banbury mixer preheated to 150° C. and mixed for 1 minute at third speed. The chemical to be tested is mixed with the carbon black and one-half of this mixture and the aromatic oil added to the Banbury and mixing continued for 1 minute at second speed. The other half of the carbon black mixture is then added and mixing continued for 4 minutes at second speed. The Banbury is then dumped and the stock blended 6 times on an open mill. The remaining ingredients are added on the mill at 70° C. Final compositions are as follows:

| | Stock, Parts by weight | |
|---|---|---|
| | G | H |
| Pre-masticated Smoked Sheets | 100 | 100 |
| Promoter | | 0.5 |
| Carbon black (high abrasion furnace) | 50 | 50 |
| Stearic acid | 2 | 2 |
| Zinc oxide | 3 | 3 |
| Aromatic oil | 5 | 5 |
| N-tert.-butyl 2-benzothiazolesulfenamide | 0.4 | 0.4 |
| Sulfur | 2.0 | 2.0 |
| Antioxidant | 2.0 | 2.0 |

The lower hysteresis as compared to the untreated control is evident from the data recorded below on the vulcanizates cured at 144° C.

| Chemical additive | 300% Modulus, Percent Change | Elongation, Percent Change | Torsional Hysteresis, Percent Change | Heat Rise, °C., Change from Control |
|---|---|---|---|---|
| Phenylenediamino-bis(N-methylphthalimide) | +4.8 | +2.5 | −16.7 | +1 |

The promoters of this invention, although especially applicable to natural rubber and butadiene-styrene copolymer rubber and mixtures thereof, are useful in synthetic rubbery homopolymers of aliphatic conjugated diene hydrocarbons, as for example cis-polybutadiene, cis-polyisoprene and in synthetic rubbery copolymers containing 50% or more of such diolefin hydrocarbons copolymerized with copolymerizable monoolefinic which includes, besides styrene, acrylonitrile, and monovinylpyridine. As illustrated, ordinary mixing temperatures suffice to improve hysteresis of the vulcanizates. Moreover, cold mixing is also suitable. Addition to the rubber at room temperature effects similar improvements. This is important in the case of rubbers which process better by cold mixing. However, the mixture must be heated to at least 100° C. prior to the vulcanization step to effect the improvements described. Heating is preferably in the range of Chemical additive: Torsional hysteresis
- None — .187
- 3,3' - p - phenylenebis(iminomethylene)bis(5,5-dimethylhydantoin — .124
- N,N' - p - phenylenebis(iminomethylene)di(2,4-thiazolidinedione) — .135
- N,N' - p - phenylenebis(iminomethylene)bis-(1,2-benzisothiazolin-3-one-1,1-dioxide — .157
- N - phthalimidomethyl-N-tetrahydrophthalimidomethyl-p-phenylenediamine — .134
- N,N' - p - phenylenebis(iminomethylene)ditetrahydrophthalimide — .158
- N,N' - [4,4' - biphenylenebis(iminomethylene)] diphthalimide — .150

It will be noted that the hydantoin is the most effective compound in these tests. Other hydantoins are incorporated into rubber in the same manner and after the heat treatment the rubber is formulated into further examples of Stock H and compared to base stock G similarly treated. The stocks are cured in the usual manner in a press for 30 minutes at 144° C. and heat rise determined after flexing in a Goodrich flexometer at 100° C. The results are recorded below:

| Chemical Additive: | Heat Rise, ° C. |
|---|---|
| None | 38 |
| 3,3' - p - phenylenebis(iminomethylene)bis(5-phenylhydantoin) | 33 |
| 3,3' - p - phenylenebis(iminomethylene)di(hydantoin) | 34 |
| 3,3' - p - phenylenebis(iminomethylene)di(5-methylhydantoin) | 34 |

The following examples are illustrative but not limitative of the preparation of the promoters:

*Example 1*

To a stirred suspension of 74.0 grams (0.5 mole) of phthalimide in 500 ml. of ethyl alcohol is added in one portion, 45 grams (0.55 mole) of 37% formaldehyde. The stirred mixture is heated at refluxing temperature for an hour after which time 27 grams (0.25 mole) of p-phenylenediamine are added in one portion. A tan solid forms immediately with heat of crystallization causing vigorous refluxing of solvent. After initial heat has subsided, the mixture is stirred at refluxing temperature for one hour, cooled and the solid removed by filtration. After washing the product with ethyl alcohol, it is air-dried to afford a 98% yield of N,N'-bis(phthalimidomethyl)-p-phenylenediamine as a tan solid. Substituting an equal molar portion of thiophthalimide and of dithiophthalimide in the foregoing procedure yields N,N'-bis(thiophthalimidomethyl) - p - phenylenediamine and N,N'-bis(dithiophthalimidomethyl)-p - phenylenediamine respectively, both of which are tan solids.

*Example 2*

To prepare N - nitroso - N,N' - bis(phthalimidomethyl)-p-phenylenediamine, 43 grams (0.1 mole) of the product of Example 1 is suspended in 350 ml. of glacial acetic acid and 84 ml. of concentrated hydrochloric acid added. The mixture is cooled to −5° C. to 0° C. and stirred while 16 grams (0.28 mole) of 97% sodium nitrite dissolved in 50 ml. of water are added dropwise over a period of 45 minutes. A solid begins to form after the addition is completed. Stirring is continued at 0-20° C. for 2 hours after which time the solid is removed by filtration, washed with water until neutral to litmus and air-dried. A yield of 75.4% is obtained as a solid melting at 155–158° C. It contains 15.92% nitrogen (Dumas) as compared to 15.50% calculated for $C_{24}H_{17}N_5O_5$.

*Example 3*

To a stirred suspension of 26.0 grams (0.2 mole) of 5,5-dimethylhydantoin in 300 ml. of ethyl alcohol is added 18 grams (0.22 mole) of 37% formaldehyde. The stirred mixture is brought to refluxing temperature and stirred and heated at this temperature for one hour. After cooling to room temperature, 10.8 grams (0.1 mole) of p-phenylenediamine are added in one portion. Heating at refluxing temperature is continued for 2 hours and the reaction mixture then filtered hot and air-dried at room temperature. 3,3' - p - phenylenebis(iminomethylene)bis(5,5-dimethylhydantoin) is obtained as a pink solid melting at 210–211° C. It contains 22.1% nitrogen as compared to 21.7% calculated for $C_{18}H_{24}N_6O_4$.

*Example 4*

To 42 grams (0.219 mole) of 4-nitrophthalimide in 400 ml. of ethyl alcohol is added 18 grams (0.22 mole) of 37% formaldehyde. The mixture is heated at refluxing temperature for 45 minutes after which time 11 grams (0.1 mole) of p-phenylenediamine are added in one portion. The resulting solution is stirred at refluxing temperature for one hour and filtered hot. The filtrate is then added to 1500 grams of ice-water and stirred. A gray-brown solid precipitates and is removed by filtration, washed with water and air-dried. N,N'-bis(4-nitrophthalimidomethyl)-p-phenylenediamine is obtained as a tan solid melting at 173–178° C. after recrystallization from ethyl alcohol/water.

*Example 5*

A mixture of 40 grams (0.4 mole) of succinimide and 36 grams (0.44 mole) of 37% formaldehyde in 500 ml. of ethyl alcohol is stirred and heated at refluxing temperature for 1½ hours after which time it is cooled at 64° C. and 22 grams (0.2 mole) of p-phenylenediamine added in one portion. A rapid rise of 4° in temperature is noted. The mixture is stirred at refluxing temperature for 1 hour during which time solids form in the hot mixture. After cooling to 5° C., the solid is removed by filtration, washed with 50 ml. of cold alcohol and air - dried. N,N'bis(succinimidomethyl)-p-phenylenediamine is obtained in 100% yield as a pale purple solid melting at 224–236° C. It contains 16.88% nitrogen as compared to 16.97% calculated for $C_{16}H_{18}N_4O_4$.

*Example 6*

A mixture of 37.5 grams (0.25 mole) of tetrahydrophthalimide and 22 grams (0.27 mole) of 37% formaldehyde in 300 ml. of ethyl alcohol is stirred and heated at refluxing temperature for 1 hour. After cooling to room temperature, 13.5 grams (0.125 mole) of p-phenylenediamine is added in one portion and the reaction again heated. At 50° C. a white crystalline solid precipitates. The temperature is raised to and maintained at refluxing temperature for 30 minutes. The product is then filtered hot and dried at rom temperature. N,N'-p-phenylenebis-(iminomethyl)ditetrahydrophthalimide is obtained in 80.5% yield as a white solid melting at 183–185° C. after recrystallization from toluene. It contains 12.18% nitrogen as compared to 12.91% calculated for $C_{24}H_{26}N_4O_4$.

*Example 7*

A mixture of 24 grams (0.2 mole) of 2,4-thiazolidinedione and 18 grams (0.2 mole) of 37% formaldehyde in 300 ml. of ethyl alcohol is stirred and heated at refluxing temperature for 1 hour. After cooling to room temperature, 10.8 grams (0.1 mole) of p-phenylenediamine are then added in one portion. Heat is again applied and a precipitate starts to form after 2 or 3 minutes at 30° C. The mixture is stirred at refluxing temperature for 2 hours and the insolubles removed by filtration from the hot mixture. After washing well with ethyl alcohol and air-drying, 100% yield of N,N'-p-phenylenebis(iminomethylene)di(2,4-thiazolidinedione) is obtained. It is a pale lavender solid metling at 168–170° C. and analyzing 15.14% nitrogen as compared to 15.28% calculated for $C_{14}H_{14}N_4O_4S_2$.

*Example 8*

A solution of saccharin (benzoysulfonicimide) is prepared by mixing 18.3 grams (0.1 mole) in 250 ml. of dioxane and to this solution is added 9.0 grams (0.1 mole) of 37% formaldehyde. The solution is stirred and heated at refluxing temperature for 1 hour. After cooling to 26° C., 5.4 grams (0.05 mole) of p-phenylenediamine dissolved in 50 grams of dioxane are added dropwise over a period of 20 minutes. A 3° rise in temperature is noted during the addition. After addition is complete solid begins to precipitate from the clear solution. Stirring is continued for 2 hours after which time a tan-brown solid is removed by filtration, washed well with acetone and air-dried. N,N'-p-phenylenebis(iminomethylene)bis-(1,2-benzisothiazolin-3-one-1,1dioxide) is obtained as a brown solid (M.P. 158–160° C.) in 92% yield. It contains 11.93% nitrogen as compared to 11.25% calculated for $C_{22}H_{18}N_4O_6S_2$.

*Example 9*

A charge consisting of 17.7 grams (0.1 mole) of hydroxymethylphthalimide, 18.1 grams (0.1 mole) of tetrahydrohydroxymethylphthalimide, 10.8 grams (0.1 mole) of p-phenylenediamine in 250 ml. of ethyl alcohol is stirred and heated at refluxing temperature for 1 hour and a light yellow precipitate results. This precipitate is filtered hot, washed with heptane and air-dried at room temperature. An 84% yield of N-phthalimidomethyl-N'-tetrahydrophthalimidomethyl-p-phenylenediamine is obtained. After recrystallization from nitrobenzene the light orange solid melts at 251–253° C. It contains 13.13% nitrogen as compared to 13.05% calculated for $C_{24}H_{20}N_4O_4$.

*Example 10*

A charge consisting of 35.4 grams (0.2 mole) of hydroxymethylphthalimide, 18.4 grams (0.1 mole) of benzidine and 300 ml. of ethyl alcohol is stirred and heated at refluxing temperature for 2 hours. The product is then filtered hot, washed with 100 ml. of ethyl alcohol and air-dried at room temperature. N,N'-[4,4'-biphenylenebis(iminomethylene)]diphthalimide is obtained in 91.5% yield. It melts at approximately 265° C. and contains 11.14% nitrogen as compared to 11.15% calculated for $C_{30}H_{22}N_4O_4$.

*Example 11*

To 32.6 grams (0.2 mole) of bicyclo[2.2.1]-hept-5-ene-2,3-dicarboximide in 300 ml. of ethyl alcohol are added 18.0 grams (0.2 mole) of 37% formaldehyde. The mixture is stirred at refluxing temperature for 1 hour, cooled to 30° C. and 10.8 grams (0.1 mole) of p-phenylenediamine added in one portion. Upon heating and stirring at refluxing temperature, solid precipitates. Refluxing is continued for 1 hour, the product cooled to 3° C., filtered and extracted with 50 ml. of cold ethyl alcohol. After air-drying N,N'-p-phenylenebis(iminomethylene)bis(bicyclo[2.2.1]hept-5-ene-2,3-dicarboximide) is obtained as a light purple solid in 95.1% yield. It melts at 240.5–241.5° C. and contains 12.15% nitrogen as compared to 12.20% calculated for $C_{26}H_{26}N_4O_4$.

*Example 12*

A mixture of 32.8 grams (0.2 mole) of 5-nitroindazole and 18.0 grams (0.2 mole) of 37% formaldehyde in 300 ml. of ethyl alcohol is heated and stirred at refluxing temperature for 1 hour. Upon cooling to 30° C., a solid precipitates. To this reaction mixture at 55° C. is added in one portion, 10.8 grams (0.1 mole) of p-phenylenediamine. A large tacky ball forms with continued heating and with fast agitation the tacky ball turns to orange crystals. Heating at refluxing temperature is continued for an hour, the product filtered hot and air-dried. 1,1'-p-phenylenebis(iminomethylene)bis(5-nitroindazole), a reddish-brown solid melting at 196.5–197° C. is obtained in 91.5% yield. It contains 24.71% nitrogen (Dumas) as compared to 24.45% calculated for $C_{22}H_{18}N_8O_4$.

*Example 13*

A mixture of 29.2 grams (0.2 mole) of phthalazone [1(2H)phthalazinone, M.P. 187–189° C.] and 18.0 grams (0.2 mole) of 37% formaldehyde in 300 ml. of ethyl alcohol is heated and stirred at refluxing temperature for 1 hour. The heating mantle is then removed, the mixture allowed to cool to 29° C. with stirring (requiring approximately 75 minutes) and then 10.8 grams (0.1 mole) of p-phenylenediamine is added in one portion. Heating and stirring at refluxing temperature is continued for 1 hour. A solid precipitates at 59° C., approximately 15 minutes after the addition of the p-phenylenediamine. The reaction is then cooled to 0–5° C., filtered, washed with cold alcohol and air-dried. An 88.5% yield of yellow crystals is obtained melting at 267° C. These crystals are slurried in hot ethyl alcohol, filtered hot and the solid air-dried. 2,2'-p-phenylenebis(iminomethylene)di(1-phthalazinone) is obtained as a yellow solid melting at 254–255° C.

*Example 14*

A mixture of 35.2 grams (0.2 mole) of 5-phenylhydantoin, 300 ml. of ethanol and 18.0 grams (0.2 mole) of 37% formaldehyde is heated and stirred at refluxing temperature for 1 hour. The mixture is cooled to 30° C. and 10.8 grams (0.1 mole) of p-phenylenediamine added in one portion. Heating at refluxing temperature is resumed for 50 minutes and the reaction mixture cooled and filtered. The filtered grey solids are dissolved in dimethyl formamide and thrown out of solution by addition of water. The water is decanted, additional water added and the precipitated solids filtered and air-dried. The solids are slurried twice in boiling water, filtered hot, extracted with hot water and dried at 50° C. There is obtained 20 grams of 3,3'-p-phenylenebis(iminomethylene)bis(5-phenylhydantoin) as a pink-gray solid, M.P. 180° C. Analysis gives 17.24% nitrogen compared to 17.30% calculated for $C_{28}H_{24}N_6O_4$.

*Example 15*

A mixture of 20 grams (0.2 mole) of hydantoin, 150 ml. of ethyl alcohol, 10 ml. of water and 18.0 grams (0.2 mole) of 37% formaldehyde is heated and stirred at refluxing temperature for 1 hour at which time a clear solution forms. After cooling to 25° C., 10.8 grams (0.1 mole) of p-phenylenediamine is added in one portion. The mixture is then heated and stirred at refluxing temperature for 2 hours, a precipitate beginning to form at about 40° C. After cooling to 10° C. a light lavender solid is removed by filtration, washed with cold ethyl alcohol-water (50:50 mixture) and then with water and air-dried. A 100% yield of 3,3'-p-phenylenebis(iminomethylene)di(hydantoin) is obtained melting at 229–231° C.

*Example 16*

A charge consisting of 19 grams (0.167 mole) of recrystallized 5-methylhydantoin (M.P. 146–147° C.), 100 ml. of ethyl alcohol and 14 grams (0.173 mole) of 37% formaldehyde is stirred and heated at refluxing temperature for 70 minutes. After cooling the charge to 30° C., 9.02 grams (0.0835 mole) of p-phenylenediamine is added in one portion and the reactor is washed down with about 10 ml. of ethyl alcohol. The reaction mixture is stirred at refluxing temperature for 10 minutes, after which time a pale lavender solid begins to precipitate. Stirring at refluxing temperature is continued for a total of 1½ hours. The reaction mixture is cooled to 10° C. and maintained at this temperature for an hour. The solid is removed by filtration, washed well with water and air-dried. There is obtained 15 grams of 3,3'-p-phenylenebis(iminomethylene)di(5-methylhydantoin) as a pale lavender solid melting at 203–205° C. It contains 22.91% nitrogen compared to a calculated value for $C_{16}H_{20}N_6O_4$ of 23.32%.

*Example 17*

A stirred mixture of 9.4 grams (0.0758 mole) of N,N'-dimethyl-p-phenylenediamine, 250 ml. of ethyl alcohol, and 26.8 grams (0.1516 mole) of N-hydroxymethylphthalimide is heated slowly to 50° C. where solution is complete. Upon reaching a temperature of 54–55° C. an orange solid begins to form. The mixture is then heated at refluxing temperature for 1 hour, after which time the solid is removed by filtration from the hot mixture, washed with 50 ml. of ethyl alcohol and air-dried. There is obtained 29.2 grams (85% yield) of N,N'-bis(phthalimidomethyl)-N,N'-dimethyl-p-phenylenediamine as orange crystals, M.P. 228–231° C. The compound is soluble in chloroform but insoluble in other common organic solvents.

*Example 18*

A mixture of 32 grams (0.25 mole) of 5,5-dimethylhydantoin, 150 ml. of ethyl alcohol and 22.5 grams (0.26 mole) of formaldehyde was heated and stirred at refluxing temperature for 1 hour. After cooling to 25–30° C., 23 grams (0.125 mole) of benzidine are added in one portion. The reaction mixture is then heated at refluxing temperature for 3 hours and cooled to 0–5° C. Upon adding 500 ml. of water and stirring a viscous semi-solid forms. Upon drying on a porous plate, 3,3'-[4,4'-biphenylenebis(iminomethylene)]bis(5,5 - dimethylhydantoin) is obtained in 86% yield as a grey solid.

*Example 19*

In the procedure of Example 18, the charge is 64 grams (0.5 mole) of 5,5-dimethylhydantoin, 150 ml. of methyl alcohol, 45 grams (0.52 mole) of 37% formaldehyde and 50 grams (0.25 mole) of 4,4'-methylenedianiline, 3,3'-[4,4'-methylenebis(phenyleneiminomethylene)]bis(5,5-dimethylhydantoin) is obtained in 96.5% yield as a tan solid.

It is intended to cover all changes and modifications of the examples of the invention herein chosen for purposes of disclosure which do not constitute departures from the spirit and scope of the invention.

What is claimed is:

1. A compound of the formula

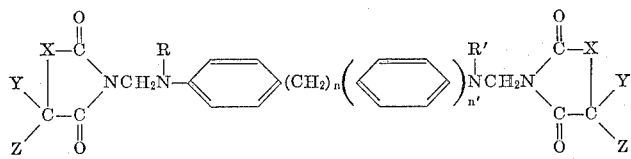

where $n$ and $n'$ are independent integers zero to one inclusive, $n$ being zero when $n'$ is zero, R and R' are selected from a group consisting of hydrogen, nitroso and lower alkyl, X is selected from a group consisting of S and NH, Y and Z are selected from a group consisting of phenyl, lower alkyl and hydrogen.

2. 3,3'-p-phenylenebis(iminomethylene)bis(5 - phenylhydantoin).

3. 3,3' - p - phenylenebis(iminomethylene)bis(5,5-dimethylhydantoin).

4. 3,3'-p-phenylenebis(iminomethylene)di(hydantoin).

5. 3,3' - p - phenylenebis(iminomethylene)di(5-methylhydantoin).

6. N,N' - p - phenylbenebis(iminomethylene)di(2,4-thiazolidinedione).

7. A compound of the formula

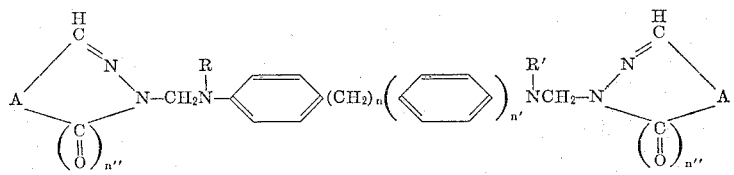

where A is selected from a group consisting of ortho-phenylene, halogenated ortho-phenylene, lower alkyl ortho-phenylene, lower alkoxy ortho-phenylene and nitro-ortho-phenylene, $n$, $n'$ and $n''$ are independent integers zero to one inclusive, $n$ being bero when $n'$ is zero, and R and R' are selected from a group consisting of hydrogen, lower alkyl and nitroso.

8. 1,1'-p-phenylenebis(iminomethylene)diindazole.

9. 1,1'-p-phenylenebis(iminomethylene)bis(5 - nitroindazole).

10. 2,2'-p-phenylenebis(iminomethylene)di(1 - phthalazinone).

No references cited.

NICHOLAS S. RIZZO, *Primary Examiner.*

WALTER A. MODANCE, *Examiner.*